April 28, 1931.   R. S. CROSBY ET AL   1,802,631
MECHANISM FOR FEEDING METAL BLANKS
Original Filed Aug. 31, 1928   2 Sheets-Sheet 1.

INVENTORS
Reuben S. Crosby
Frank E. Newton
Harry R. Williams
ATTORNEY

April 28, 1931.　　　R. S. CROSBY ET AL　　　1,802,631
MECHANISM FOR FEEDING METAL BLANKS
Original Filed Aug. 31, 1928　　2 Sheets-Sheet 2
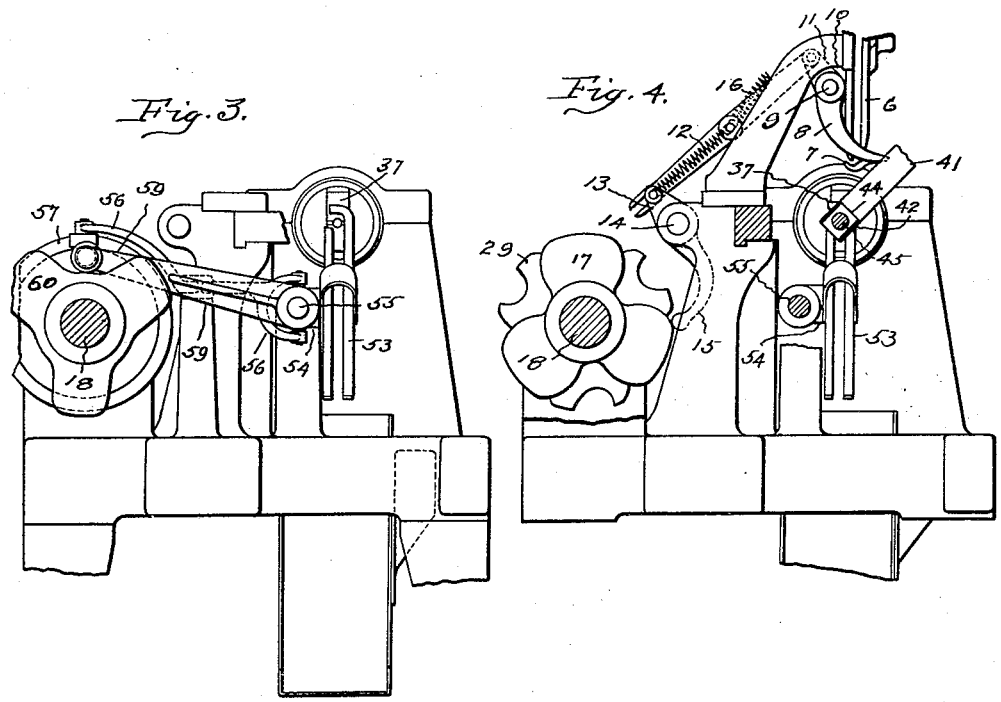
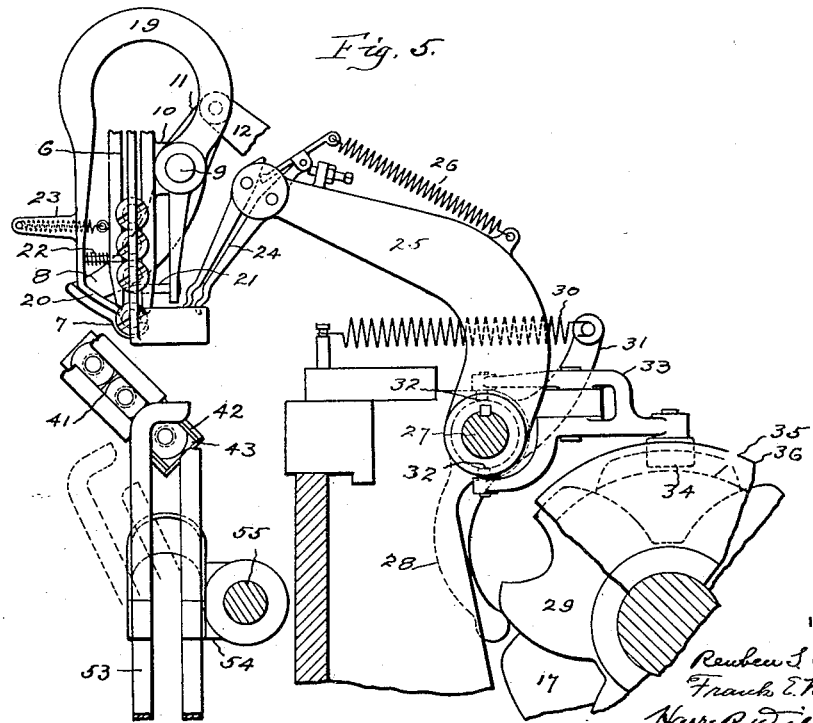

Patented Apr. 28, 1931

1,802,631

UNITED STATES PATENT OFFICE

REUBEN S. CROSBY AND FRANK E. NEWTON, OF HARTFORD, CONNECTICUT; SAID CROSBY ASSIGNOR TO SAID NEWTON

MECHANISM FOR FEEDING METAL BLANKS

Original application filed August 31, 1928, Serial No. 303,184. Divided and this application filed July 2, 1929. Serial No. 375,398.

This application is a division of our copending application Serial No. 303,184 filed August 31, 1928, Patent No. 1,737,876, Dec. 3, 1929.
This invention relates to a machine for feeding bolts and screw blanks, and is illustrated and described herein as embodied in a machine for turning bolts into nuts of the class disclosed in the copending application of R. S. Crosby, Serial No. 237,025 filed Dec. 1, 1927, Patent No. 1,739,712, Dec. 17, 1929. In the machine of this prior application the bolts and nuts are fed into alignment and the nuts push the bolts into a rotating chuck by which the bolts are turned into the nuts.

The objects of the present invention are to provide improved means which will positively control the feeding of bolts or blanks from the chute and will ensure the accurate insertion of the blanks into the chuck, whereby the machine, whether a threader, shaver and pointer, or a nutting machine, may be operated at high speed without failure to feed the blanks.
In the present conception a gate and a cut-off allow but one blank at a time to be dropped upon a carrier which transfers the blank into position to be picked up by fingers that swing down and carry it into alignment with the chuck and then move transversely and pass the head of the blank into the jaws of the chuck.

Figure 1:
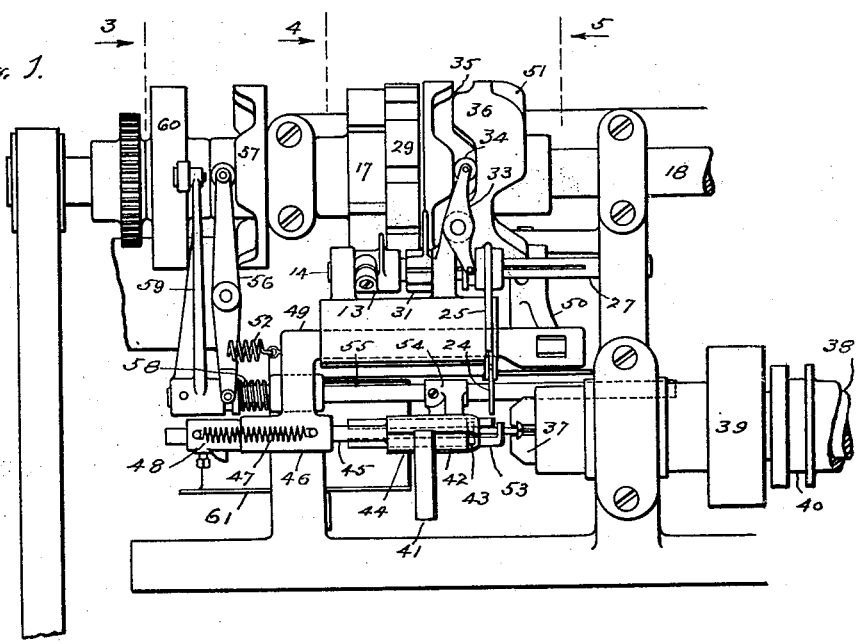
Figure 2:
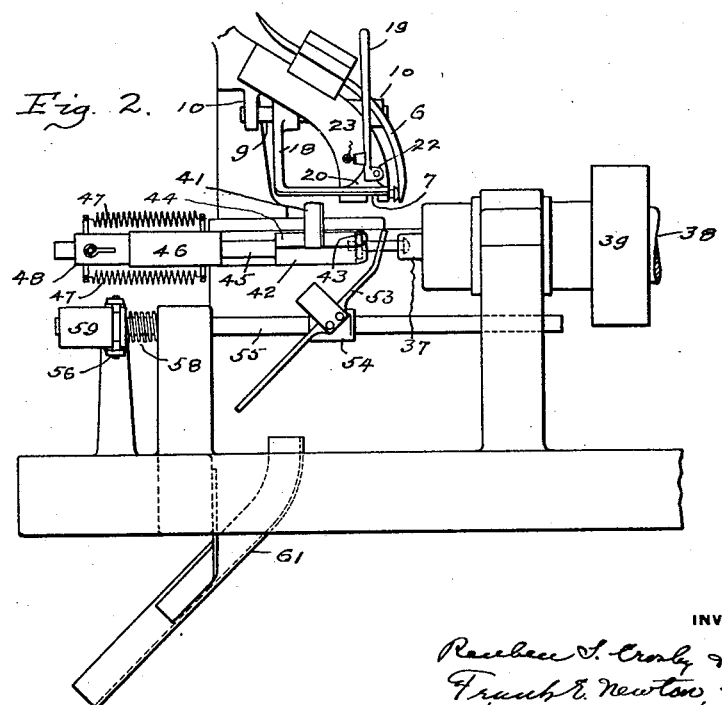

In the accompanying drawings Fig. 1 is a plan view showing so much of a nutting machine as is pertinent to this invention. Fig. 2 is a front elevation showing a part of the blank control and the sorting mechanism of the machine. Fig. 3 is a vertical section looking toward the sorting mechanism, the section being taken on approximately the dotted line 3 on Fig. 1. Fig. 4 is a vertical section on approximately the dotted line 4 on Fig. 1. Fig. 5 is section on larger scale taken on approximately the dotted line 5 on Fig. 1 showing the blank feed controlling and transfer mechanisms, and the sorting fingers.

Headed blanks from the source of supply slide down the curved chute 6 hanging by their heads and turn into a horizontal position at the lower end of the chute. Movable under the bottom of the chute is a carrier 7 designed to receive the lowest blank. This carrier projects from the end of an angular rocker arm 8 that is fastened to rock shaft 9 which is mounted in brackets 10 attached to the chute, Figs. 2, 5. Fastened to this rock shaft is a rocker arm 11 that by a link 12 is connected wth the upper end of a lever 13 which is pivoted at 14 and has its lower end 15 held by the tension of a spring 16 in engagement with the cam 17 on the main cam shaft 18, Fig. 4. By this mechanism the lowest blank is taken from the bottom of the chute and carried a short distance toward the rear of the machine.

Fastened to the rock shaft 9 so as to oscillate therewith and with the carrier is a yoke 19. The lower end of the front limb of this yoke is shaped to form a gate 20 that when the carrier is under the end of the chute, stands in front of the opening at the bottom of the chute, but when the carrier swings back this gate swings under and closes the bottom of the chute and prevents a blank from dropping therefrom. The edge of the gate may engage with the blank in the carrier and thus ensure the transfer of the blank with the carrier. At the lower end of the back limb of the yoke is an escapement pin 21 that when the gate is forward projects into the chute and supports the blanks and that when the yoke swings back and the gate closes the runway, swings out and allows a blank to drop onto the gate. Extending from the front limb of the yoke is a spring escapement pin 22 that is adapted to project into the chute and support the blanks when the pin 21 swings out and allows the lowest blank to drop onto the gate. A spring 23 tends to draw the yoke so that the pin 22 will project into the chute and support the blanks, Fig. 5.

By this control means the blanks are prevented from clogging or jamming in the chute, and but one blank at a time is allowed to feed to the carrier, which blank is positively controlled so that it will be properly fed with the machine running at high speed.

When the carrier swings back it carries a blank into position to be grasped by a pair of fingers 24 which are pivotally mounted at the upper end of a lever 25 and that are normally closed by a spring 26, Fig. 5. This lever is splined to a rock shaft 27 so that it will oscillate with the shaft and may be moved longitudinally on the shaft. Fastened to the shaft 27 is a rocker arm 28 that is engaged by a cam 29 on the main cam shaft. A spring 30 connected with an arm 31 fastened to the shaft holds the arm 28 in engagement with the cam, Fig. 5. This cam is shaped to, at the proper times, cause the fingers 24 to pick up a blank from the carrier and carry it into line with the axis of the chuck.

The hub of the lever 25 is grooved and extending into this groove are pins 32 at the front end of a forked lever 33. The rear end of this lever has a roll 34 that lies in a cam groove 35 in a cam disk 36 on the main cam shaft, Figs. 1, 5. After the fingers have picked up a blank and carried it into line with the chuck this cam causes the fingers to move transversely and carry the blank head into the chuck jaws, after which the fingers are mover back and swung up into the plane of the carrier at the end of the chute.

The chuck 37, Figs. 1, 2, 3, may be any common opening and closing jaw type, whose operating mechanism is well known to those skilled in the screw machine art, consequently it is not illustrated in detail. It is sufficient to mention that the chuck is carried at the end of a rotating spindle 38 provided with a driving pulley 39, Figs. 1, 2. The chuck is opened and closed by the movement of the grooved collar 40, Fig. 1, in the ordinary way. When a blank head is thrust into the chuck by the transfer fingers the jaws are closed upon the head so that the blank will rotate with the chuck.

In the nutting machine shown the nuts slide down a chute 41 from the source of supply to a carrier 42 which moves longitudinally below the chute in alignment with the chuck. At its forward end this chuck has an opening 43 which, when the carrier is retracted lies below the open end of the chute so as to receive a nut. When the carrier moves forward its flat surface 44 closes the opening from the chute. The carrier has a shank 45 which is movably fitted in a slide 46 and is normally pulled forward by a pair of springs 47 connected between the slide and a collar 48 attached to the shank, Fig. 2. The slide has a section 49 that has a longitudinal movement in a way in the frame and is moved forward at the proper times by a lever 50 and cam 51 and is retracted by a spring 52, Fig. 1. By this means a nut is carried forward into engagement with a rotating blank that is held by the chuck, so that the blank will be turned into the nut. When the carrier is retracted the nut remains on the blank.

The spaced fingers 53 illustrated are attached to a bracket 54 that is fastened to a shaft 55, Fig. 5. This shaft is mounted in the frame so that it can be rotated and also reciprocated. The shaft with the spaced fingers is moved forward by the yoked end of a lever 56 and a cam 57 and it is retracted by a spring 58, Fig. 1. Fastened to the shaft 55 is one end of a rocker lever 59 that has its other end engaged by cam 60 which is shaped to at the proper time cause the shaft and the fingers to oscillate. The cams 57 and 60 are timed to cause the fingers to move forward and swing up so as to embrace a blank held by the chuck. When a blank has been turned into a nut and the chuck jaws are opened and the head of the blank is released, the fingers move backward and engaging the nut withdraw the blank a short distance from the chuck, after which the fingers swing forward out of the path of the nut carrier.

This delivery mechanism is not claimed herein, but is claimed in the above mentioned application from which this application was divided.

The invention claimed is:

1. Mechanism for feeding metal blanks to a rotatory blank receiving chuck, comprising a chute for feeding the blanks, an oscillatory shaft, means for oscillating the shaft, a carrier fastened to said shaft and adapted to be oscillated thereby below the lower end of the chute, and a yoke fastened to said shaft and oscillating therewith, said yoke at one end carrying a gate positioned to move across the lower end of the chute above the carrier and drop the blanks one at a time upon the carrier, and at the other end carrying a pin adapted to move into and out of the chute and allow but one blank at a time to drop onto the gate, said yoke also carrying above the gate and said pin a pin adapted to move into the chute and hold up the blanks above when the first mentioned pin drops a blank upon the gate.

2. Mechanism for feeding metal blanks to a rotatory blank receiving chuck, comprising a chute for feeding the blanks, an oscillatory shaft, means for oscillating the shaft, and a yoke fastened to said shaft and oscillating therewith, said yoke at one end carrying a gate positioned to move across the lower end of the chute, and above the gate a pin adapted to move into and out of the chute, and at the other end said yoke carrying a pin adapted to move into and out of the chute intermediate the gate and the first mentioned pin and allow but one blank at a time to drop onto the gate.

3. Mechanism for feeding metal blanks to a rotatory blank receiving chuck, comprising a chute for feeding the blanks, an oscillatory carrier movable below the lower end of the chute, an oscillatory gate movable with the carrier for closing the lower end of the chute when the carrier is moved away therefrom, the edge of said gate engaging and ensuring the transfer of the blanks by said carrier, oscillatory pins movable with the gate alternately into and out of the chute for supporting the blanks above the gate and permitting but one blank at a time to drop upon the gate, and fingers for carrying blanks from the carrier to the chuck.

REUBEN S. CROSBY.
FRANK E. NEWTON.